US009667116B2

(12) United States Patent
Fujimoto et al.

(10) Patent No.: US 9,667,116 B2
(45) Date of Patent: May 30, 2017

(54) GENERATOR WITH BRACKETS WITH POSITIONING HOLES FOR KNOCK PINS FOR AXIAL ALIGNMENT OF A DRIVE SHAFT AND A ROTARY SHAFT

(71) Applicant: SAWAFUJI ELECTRIC CO., LTD., Ota-Shi, Gunma (JP)

(72) Inventors: Atsushi Fujimoto, Ota (JP); Akizumi Yanai, Ota (JP)

(73) Assignee: Sawafuji Electric Co., Ltd., Gunma (JP)

( * ) Notice: Subject to any disclaimer, the term of this patent is extended or adjusted under 35 U.S.C. 154(b) by 190 days.

(21) Appl. No.: 14/431,440

(22) PCT Filed: Sep. 26, 2013

(86) PCT No.: PCT/JP2013/076001
§ 371 (c)(1),
(2) Date: Mar. 26, 2015

(87) PCT Pub. No.: WO2014/050940
PCT Pub. Date: Apr. 3, 2014

(65) Prior Publication Data
US 2015/0244235 A1    Aug. 27, 2015

(30) Foreign Application Priority Data
Sep. 27, 2012    (JP) ................... 2012-214189

(51) Int. Cl.
*H02K 5/20*    (2006.01)
*H02K 5/04*    (2006.01)
(Continued)

(52) U.S. Cl.
CPC ................. *H02K 5/20* (2013.01); *F16M 1/04* (2013.01); *H02K 1/185* (2013.01); *H02K 5/04* (2013.01);
(Continued)

(58) Field of Classification Search
USPC .............................................. 310/58, 59, 89
See application file for complete search history.

(56) References Cited

U.S. PATENT DOCUMENTS 6,124,567 A    9/2000    Feldhausen et al.
6,172,436 B1*    1/2001    Subler ................. F16C 33/6662
29/898.11
(Continued)

FOREIGN PATENT DOCUMENTS

CN    2836326 Y    11/2006
CN    201478944 U    5/2010
(Continued)

OTHER PUBLICATIONS

Official Communication dated Aug. 26, 2016 for corresponding Chinese Patent Application No. 201380050691.X.
(Continued)

*Primary Examiner* — Naishadh Desai
(74) *Attorney, Agent, or Firm* — Carrier Blackman & Associates, P.C.; Joseph P. Carrier; Jeffrey T. Gedeon

(57) ABSTRACT

In a generator in which a stator is fixed to a housing which includes a first bracket having a bearing portion for pivotally supporting one end portion of a rotary shaft, and a second bracket covering a cooling fan that rotates with the rotary shaft, and a rotor surrounded by the stator is fixed to the rotary shaft, the stator is fixed to the first bracket, and the first bracket is integrally provided with a tubular portion which surrounds the stator for permitting cooling air sucked in by the cooling fan to flow between the tubular portion and an outer periphery of the stator, and the second bracket is connected to the tubular portion. Accordingly, cost is reduced by connecting first and second brackets together without using long through-bolts, and efficiency of cooling (Continued)

the stator is enhanced by making the cooling air flow along the outer periphery of the stator.

4 Claims, 17 Drawing Sheets

(51) Int. Cl.
    *H02K 1/18*           (2006.01)
    *H02K 5/15*           (2006.01)
    *H02K 5/173*          (2006.01)
    *H02K 9/06*           (2006.01)
    *F16M 1/04*          (2006.01)
    *H02K 5/24*           (2006.01)

(52) U.S. Cl.
    CPC .............. *H02K 5/15* (2013.01); *H02K 5/1732* (2013.01); *H02K 9/06* (2013.01); *H02K 5/24* (2013.01)

(56) References Cited

U.S. PATENT DOCUMENTS

| | | | |
|---|---|---|---|
| 6,927,511 B2 | 8/2005 | Cleanthous et al. | |
| 7,705,496 B2* | 4/2010 | Zisler ...................... | H02K 5/20 310/58 |
| 2003/0102729 A1 | 6/2003 | Sanuki | |
| 2004/0145253 A1* | 7/2004 | Browne ................... | H02K 9/14 310/58 |
| 2007/0284954 A1* | 12/2007 | Lin ......................... | H02K 11/33 310/58 |
| 2008/0231126 A1* | 9/2008 | Telore ...................... | H02K 5/20 310/59 |
| 2010/0176670 A1 | 7/2010 | Gottfried | |
| 2012/0248908 A1 | 10/2012 | Zahora et al. | |

FOREIGN PATENT DOCUMENTS

| | | |
|---|---|---|
| DE | 102009053988 A1 | 5/2011 |
| GB | 592904 A | 10/1947 |
| GB | 1352814 A | 5/1974 |
| JP | H04304144 A | 10/1992 |
| JP | 2003-061291 A | 2/2003 |
| JP | 2003-204653 A | 7/2003 |
| JP | 2007-046767 A | 2/2007 |
| JP | 2010-090858 A | 4/2010 |
| JP | 2012-135139 A | 7/2012 |

OTHER PUBLICATIONS

Official Communication dated May 30, 2016 for corresponding European Application No. EP 13 84 2975.

Official Communication dated Jun. 2, 2016 for corresponding Japanese Application No. 2012-214189.

* cited by examiner

GENERATOR WITH BRACKETS WITH POSITIONING HOLES FOR KNOCK PINS FOR AXIAL ALIGNMENT OF A DRIVE SHAFT AND A ROTARY SHAFT

TECHNICAL FIELD

The present invention relates to a generator in which a stator is fixed to a housing which includes a first bracket having a bearing portion for pivotally supporting one end portion of a rotary shaft, and a second bracket covering a cooling fan that rotates with the rotary shaft, and a rotor surrounded by the stator is fixed to the rotary shaft.

BACKGROUND ART

Patent Document 1 and the like has already made known a generator whose housing includes first and second brackets with a stator core clamped therebetween.

PRIOR ART DOCUMENT

Patent Document

Patent Document 1: Japanese Patent Application Laid-open No. 2003-61291

SUMMARY OF THE INVENTION

Problems to be Solved by the Invention

The generator disclosed in Patent Document 1 described above is designed such that: a stator is interposed between the first and second brackets with an outer periphery of the stator facing outside; and the first and second brackets are fastened together with multiple long through-bolts. This design not only increases cost, but also cannot be said to be excellent in efficiency of cooling the stator because cooling air sucked in by a cooling fan flows only inside a stator core.

The present invention has been made with the foregoing situation taken into consideration. An object of the present invention is to provide a generator which makes it possible to reduce cost by connecting first and second brackets together without using long through-bolts, and to enhance efficiency of cooling a stator by making cooling air flow along an outer periphery of the stator.

Means for Solving the Problems

In order to attain the above object, according to a first aspect of the present invention, there is provided a generator in which a stator is fixed to a housing which includes a first bracket having a bearing portion for pivotally supporting one end portion of a rotary shaft, and a second bracket covering a cooling fan that rotates with the rotary shaft, and a rotor surrounded by the stator is fixed to the rotary shaft, characterized in that the stator is fixed to the first bracket, and the first bracket is integrally provided with a tubular portion which surrounds the stator so as to permit cooling air sucked in by the cooling fan to flow between the tubular portion and an outer periphery of the stator, and the second bracket is connected to the tubular portion.

Furthermore, according to a second aspect of the present invention, in addition to the configuration of the first aspect, a plurality of parts in a peripheral direction of the outer periphery of the stator are press-fitted into the tubular portion.

Furthermore, according to a third aspect of the present invention, in addition to the configuration of the first or second aspect, a ring plate-shaped partition plate opposed to an end portion of the stator on a side of the cooling fan is fixedly provided to the cooling fan or an end portion of the tubular portion on the side of the cooling fan.

Furthermore, according to a fourth aspect of the present invention, in addition to the configuration of the first aspect, the first and second brackets are respectively provided with positioning holes into which to fit opposite end portions of a plurality of knock pins used to position the rotary shaft and a driving shaft in an axially aligned manner before the second bracket fastened to a driving source having the driving shaft coaxially connected to the rotary shaft is fastened to the first bracket whose bearing portion rotatably supports one end portion of the rotary shaft.

Effects of the Invention

According to the first aspect of the present invention, the cooling air sucked in by the cooling fan flows between an inner periphery of the tubular portion provided to the first bracket and the outer periphery of the stator fixed to the first bracket and surrounded by the tubular portion. For this reason, it is possible to enhance efficiency of cooling the stator by making the cooling air flow along the outer periphery of the stator, and to reduce cost by connecting the first and second brackets together without using long through-bolts.

Furthermore, according to the second aspect of the present invention, the stator is fixed to the first bracket by press-fitting multiple parts in the peripheral direction of the stator into the tubular portion. For this reason, it is possible to reduce the number of components.

According to the third aspect of the present invention, the ring plate-shaped partition plate fixedly provided to the cooling fan or the tubular portion is opposed to the end portion of the stator on the side of the cooling fan. For this reason, it is possible to effectively cool the end portion of the stator on the side of the cooling fan using the cooling air by changing a flow direction of the cooling air having flowed along the outer periphery of the stator, toward the rotary shaft at the end portion of the stator on the side of the cooling fan.

Furthermore, according to the fourth aspect of the present invention, the multiple knock pins are used to position the rotary shaft and the driving shaft in the axially aligned manner before the second bracket fastened to the driving source is fastened to the first bracket whose bearing portion rotatably supports the one end portion of the rotary shaft. For this reason, no recessed and projecting fitting portions are needed unlike when the first and second brackets are fittingly positioned to each other. Thus, it is possible to enhance the cooling effect further by enlarging an outer diameter of the cooling fan without enlarging a size of an outer shape of the second bracket.

EXPLANATION OF REFERENCE NUMERALS AND SYMBOLS

Figure 1:
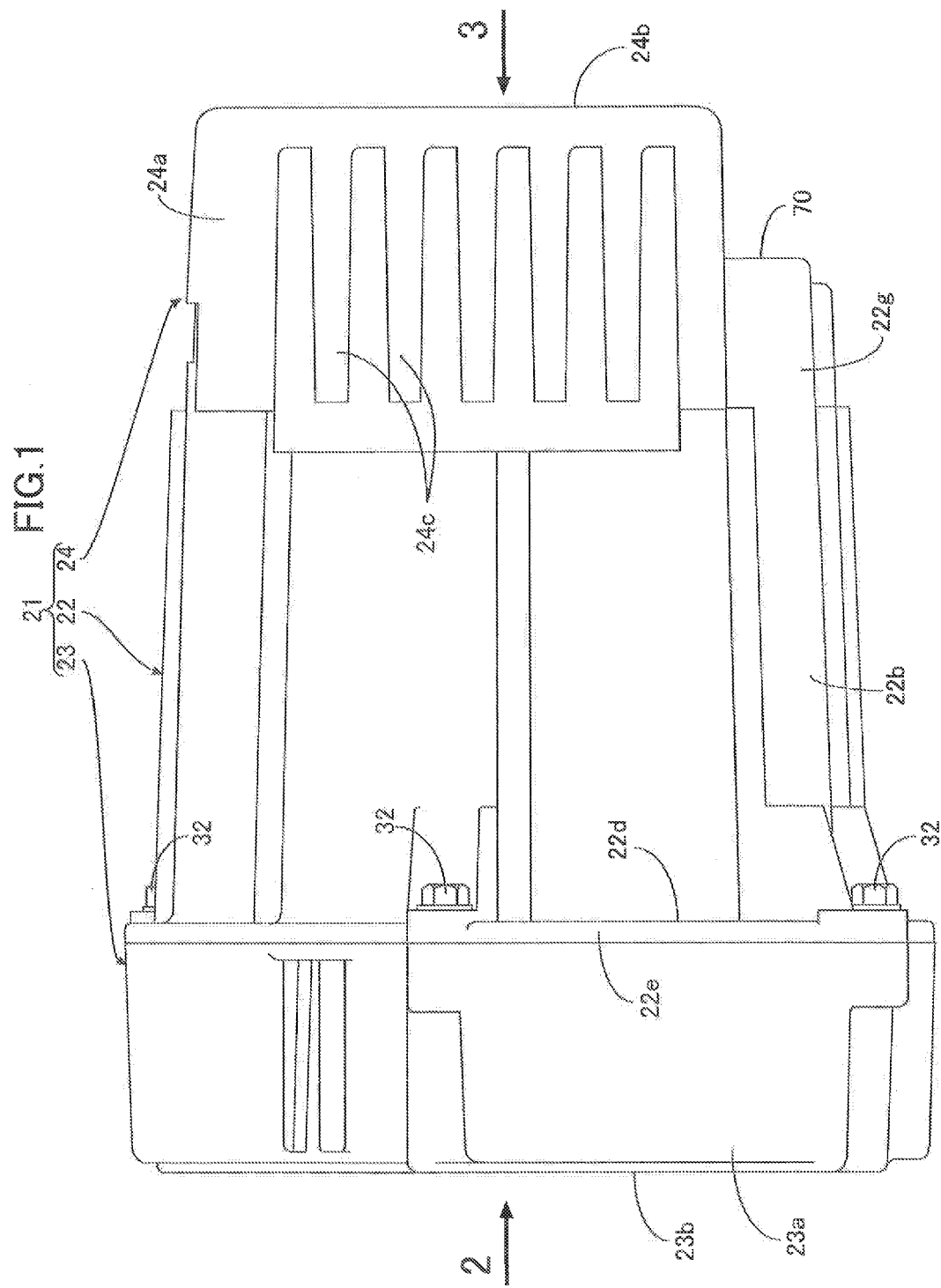
FIG. 1 is a side view of a generator of a first embodiment (first embodiment).

21 . . . housing
22 . . . first bracket
22a . . . bearing portion
22b . . . tubular portion
23 . . . second bracket
25 . . . stator
26 . . . rotor
27 . . . rotary shaft
29, 77 . . . cooling fan
29d, 78 . . . partition plate
34 . . . crankshaft as driving shaft
40 . . . knock pin
41, 42 . . . positioning hole
E . . . internal combustion engine as driving source

MODES FOR CARRYING OUT THE INVENTION

Referring to the accompanying drawings, descriptions will be hereinbelow provided for embodiments of the present invention.

First Embodiment

Figure 2:
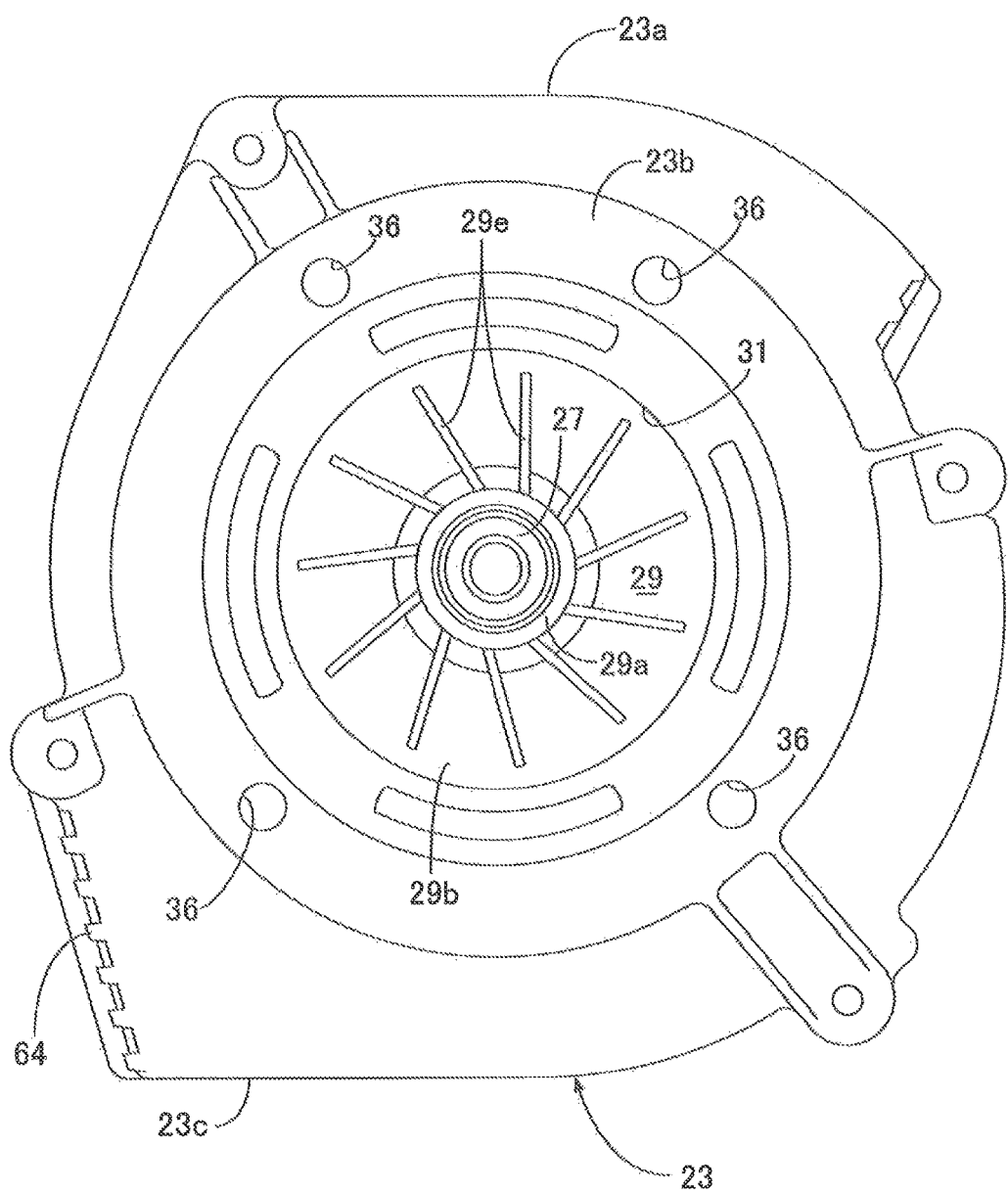
FIG. 2 is a view in a direction indicated with an arrow 2 in FIG. 1 (first embodiment).
Figure 3:
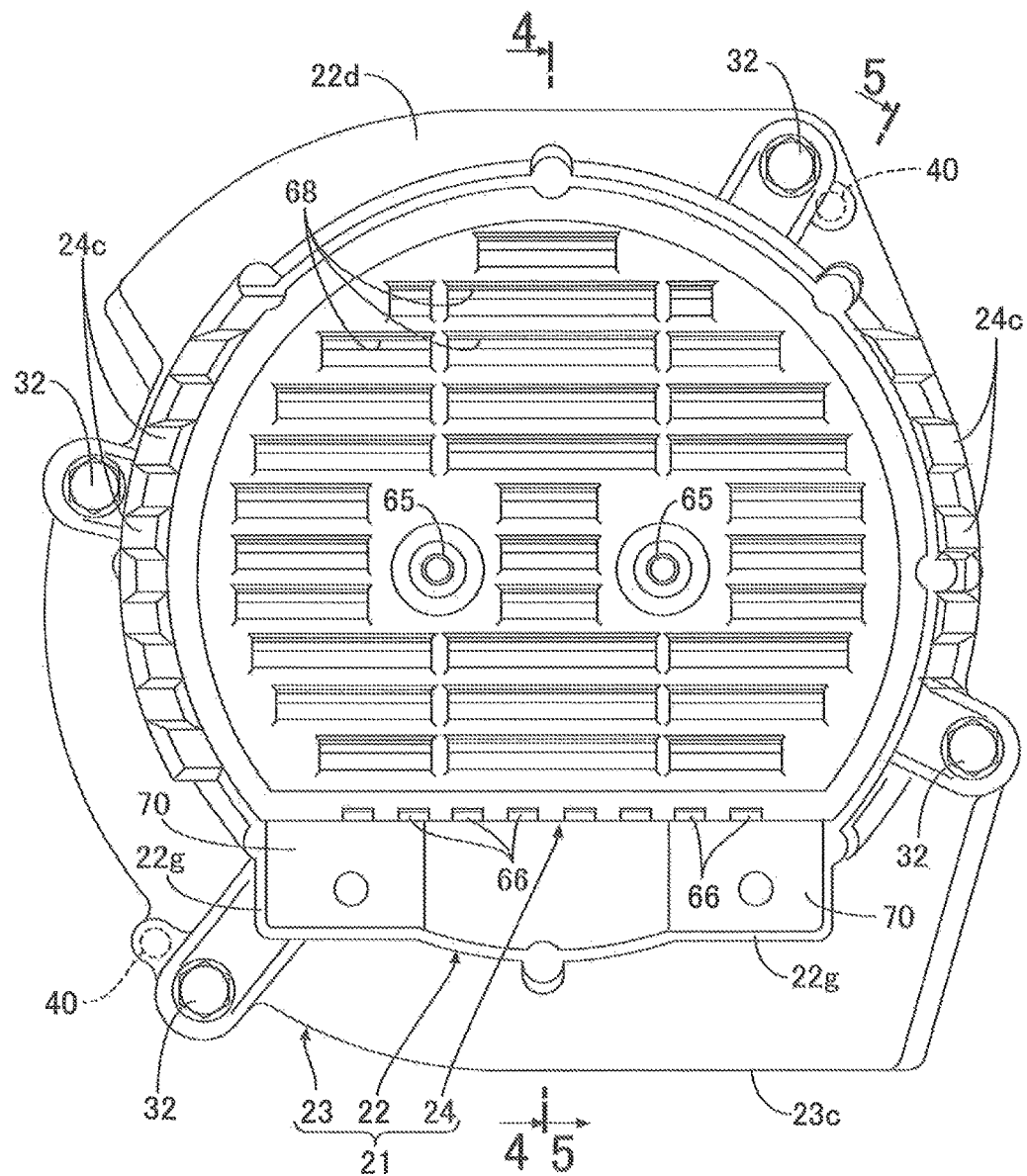
FIG. 3 is a view in a direction indicated with an arrow 3 in FIG. 1 (first embodiment).

Referring to FIGS. 1 to 16, descriptions will be provided for a first embodiment of the present invention. First of all, in FIGS. 1 to 3, a housing 21 of this generator includes: a first bracket 22; a second bracket 23 connected to the first bracket 22; and a cover 24 attached to the first bracket 22 on an opposite side from the second bracket 23.

Figure 4:
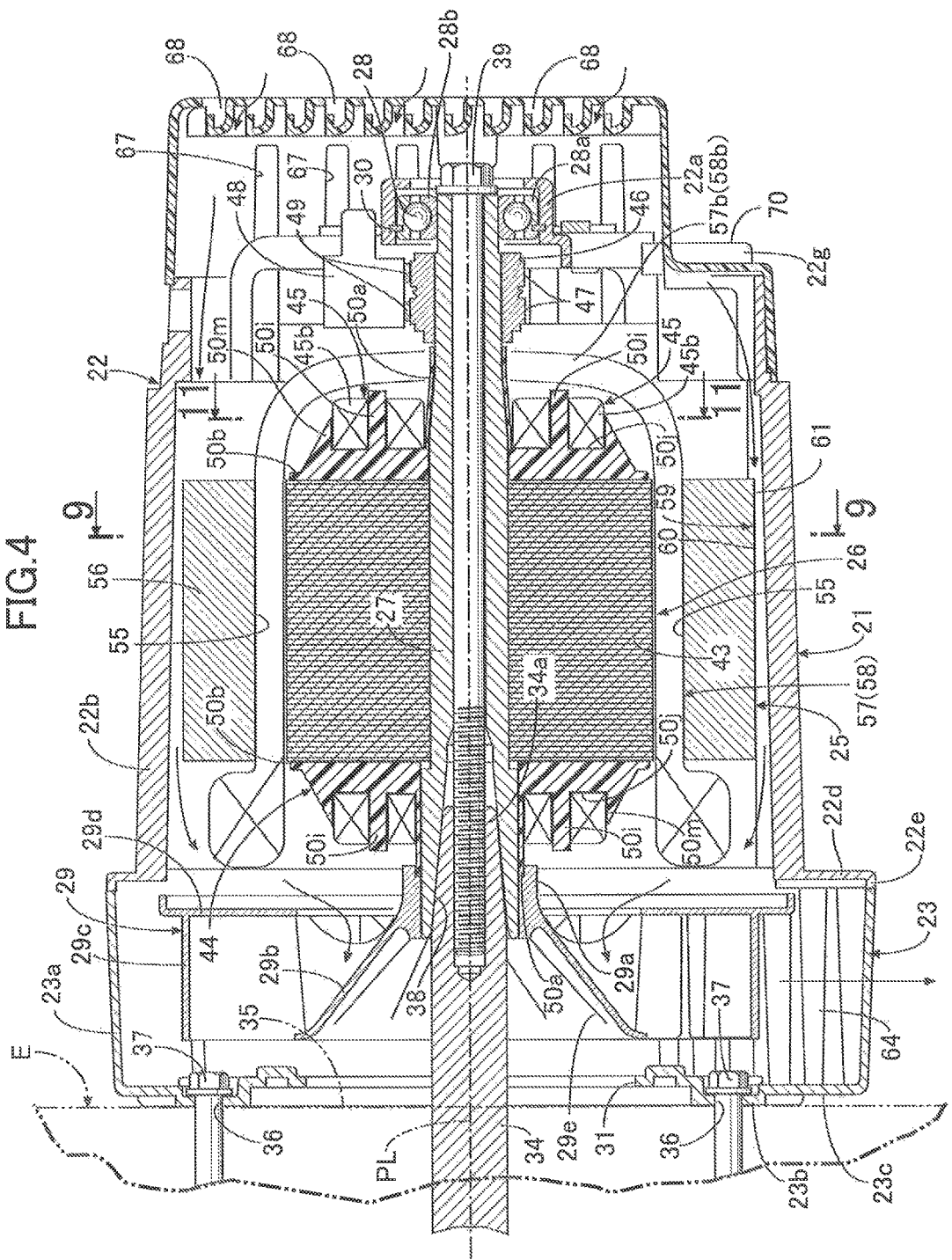
FIG. 4 is a sectional view taken along a 4-4 line in FIG. 3 (first embodiment).
Figure 5:
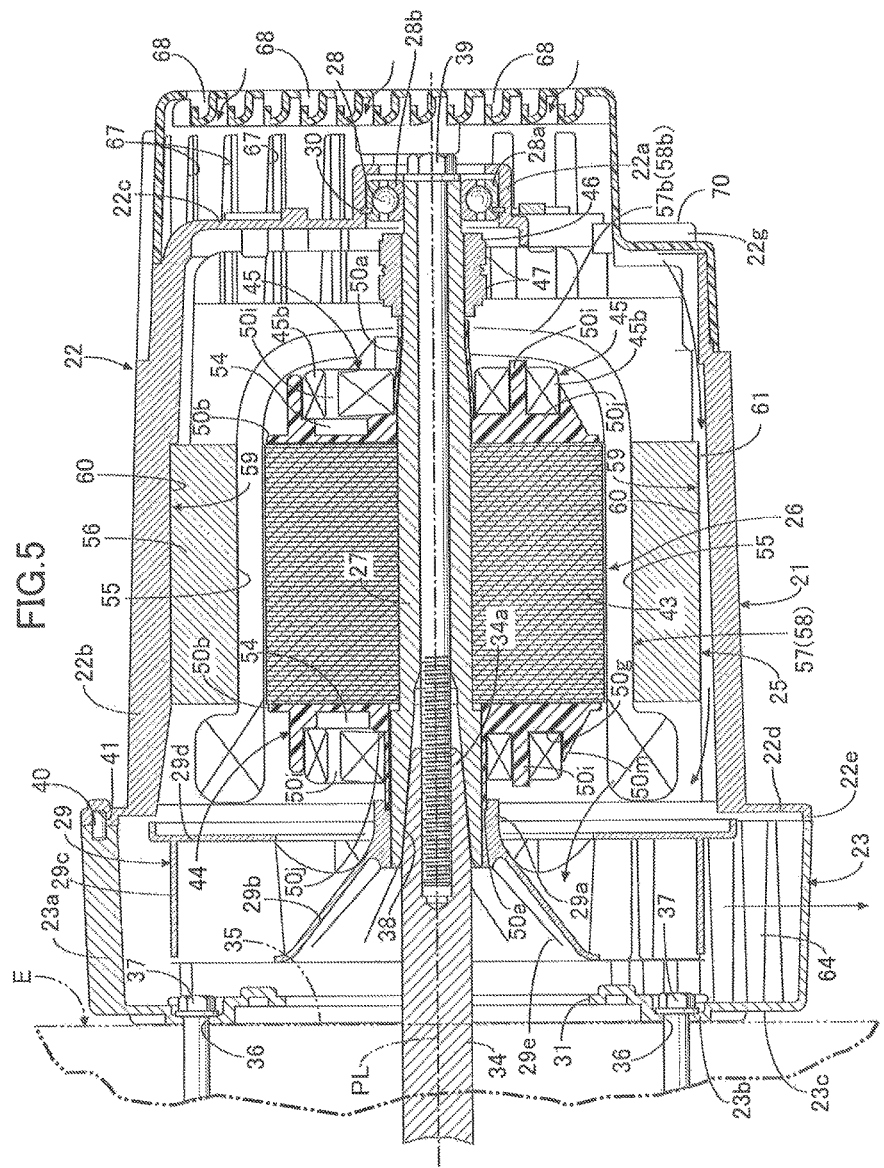
FIG. 5 is a sectional view taken along a 5-5 line in FIG. 3 (first embodiment).

Referring to FIGS. 4 and 5 together, a stator 25 is fixed to the first bracket 22 of the housing 21. One end portion of a rotary shaft 27 is rotatably supported by a bearing portion 22a included in the first bracket 22 via a ball bearing 28. A rotor 26 surrounded by the stator 25 is fixed to the rotary shaft 27. A cooling fan 29 to rotate with the rotary shaft 27 is covered with the second bracket 23.

Figure 6:
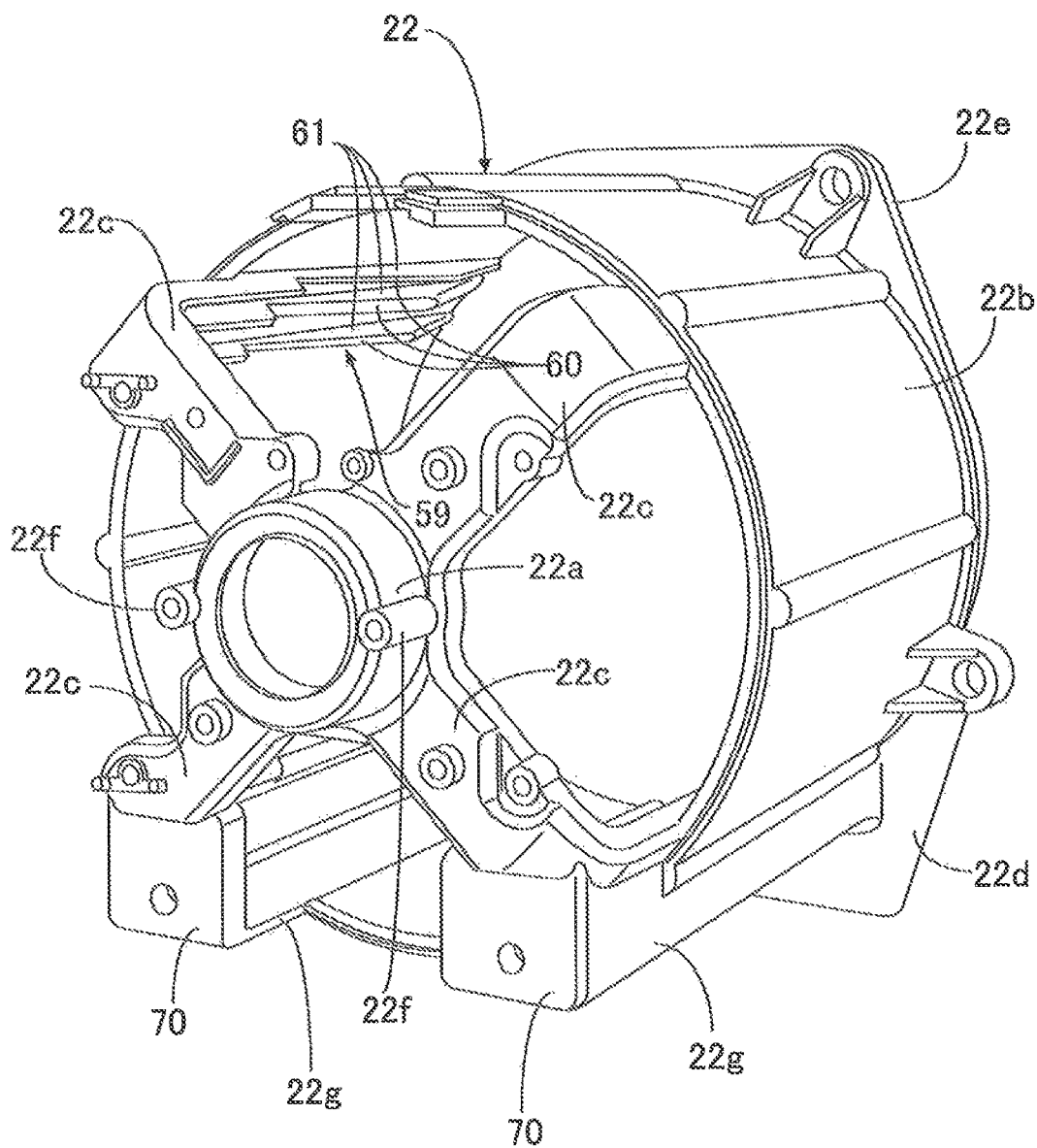
FIG. 6 is a perspective view of a first bracket (first embodiment).

Referring to FIG. 6 together, the first bracket 22 integrally includes: the bearing portion 22a formed in a short cylindrical shape with an outer race 28a of the ball bearing 28 fitted in the bearing portion 22a; a tubular portion 22b having a substantially cylindrical shape, and surrounding the stator 25; and multiple connecting arm portions 22c, 22c whose one end portions continue respectively to multiple, for example, four, places arranged at intervals in a peripheral direction of the bearing portion 22a, and whose opposite end portions continue respectively to multiple places arranged at intervals in a peripheral direction of one end portion of the tubular portion 22b.

A snap ring 30 for stopping the ball bearing 28 from moving in an axial direction inside the bearing portion 22a is interposed between an outer periphery of the outer race 28a fitted in the bearing portion 22a and an inner periphery of the bearing portion 22a.

Figure 7:
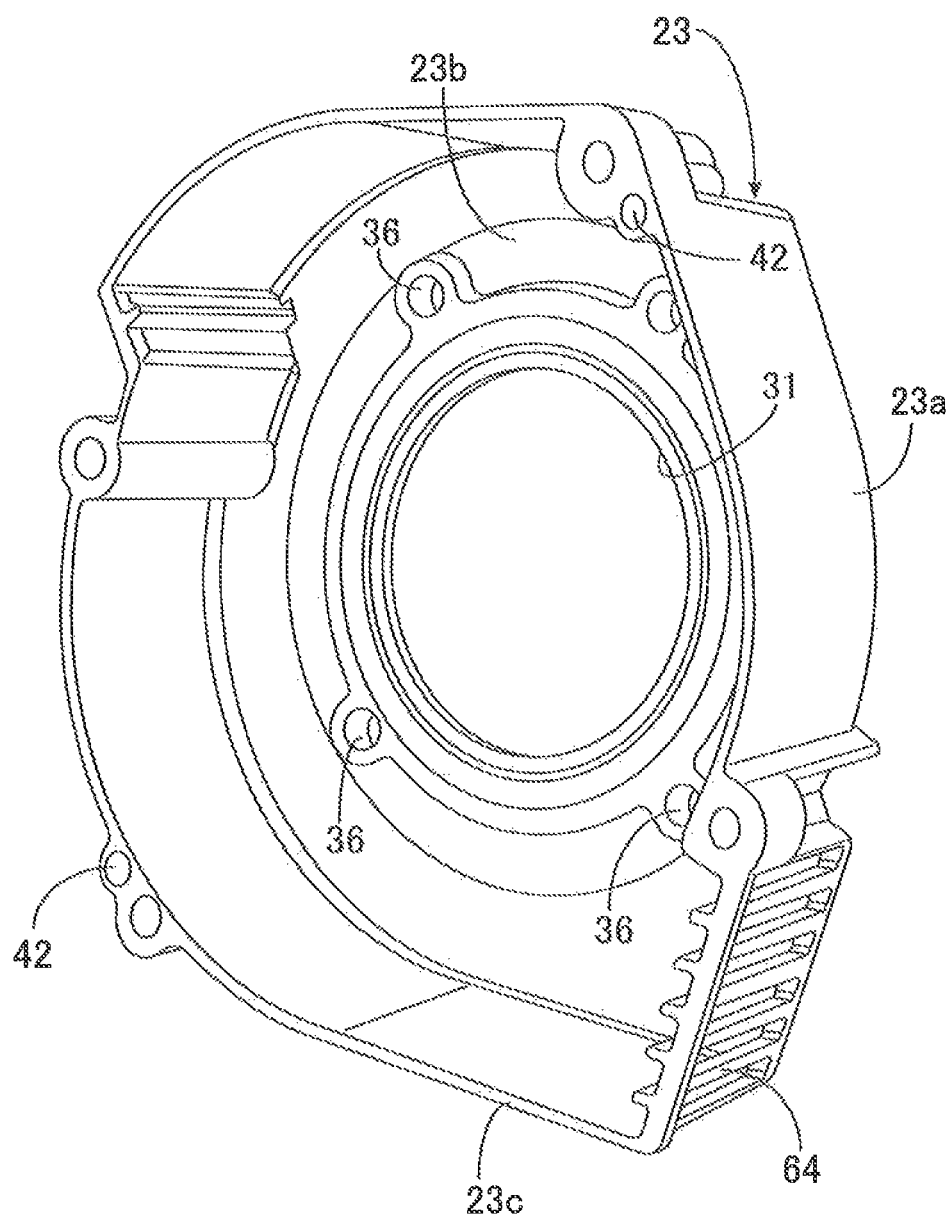
FIG. 7 is a perspective view of a second bracket (first embodiment).

Referring to FIG. 7 together, the second bracket 23 integrally includes: a tubular side wall portion 23a whose one end portion is connected to the tubular portion 22b of the first bracket 22; and an inward-facing flange portion 23b extending inward in a radial direction from an opposite end portion of the side wall portion 23a. A circular opening portion 31 is formed in an inner periphery of the inward-facing flange portion 23b.

An end portion of the tubular portion 22b of the first bracket 22 on a side of the second bracket 23 is integrally provided with a flat outward-facing flange portion 22d extending outward. A connecting protrusion 22e slightly projecting toward the second bracket 23 is integrally formed in an outer periphery of the outward-facing flange portion 22d in an endlessly continuous manner with the one end portion of the side wall portion 23a of the second bracket 23 in contact with the outer periphery of the outward-facing flange portion 22d. In addition, the connecting protrusion 22e of the first bracket 22 is fastened to the side wall portion 23a of the second bracket 23 with bolts 32, 32 which are disposed in multiple places arranged at intervals in the peripheral direction of the tubular portion 22b.

The second bracket 23 is attached to an engine body 35 of a driving source, for example, an internal combustion engine E, which includes a crankshaft 34 as a driving shaft coaxially connected to the rotary shaft 27. The inward-facing flange portion 23b of the second bracket 23 is provided with multiple, for example, four, fastening holes 36, 36 which are disposed around the opening portion 31. The second bracket 23 is fastened to the engine body 35 with bolts 37, 37 which are inserted in the fastening holes 36, 36.

The rotary shaft 27 has a taper hole 38 in its end portion on a side of the internal combustion engine E, and is formed in a cylindrical shape. A taper portion 34a in an end portion of the crankshaft 34, which penetrates through the opening portion 31 and is inserted in the second bracket 23, is coaxially fitted in the taper hole 38. A bolt 39 inserted in the rotary shaft 27 from a side of the cover 24 is screwed in, and fastened to, the crankshaft 34. Thereby, the rotary shaft 27 is coaxially connected to the crankshaft 34 in a relatively unrotatable manner.

Meanwhile, the first bracket 22 is fastened to the second bracket 23, as fastened to the engine body 35, with the stator 25 fixed to the first bracket 22, and with the rotor 26 fixed to the rotary shaft 27 whose one end portion is rotatably supported by the bearing portion 22a. When the first bracket 22 is fastened to the second bracket 23, multiple, for example, two, knock pins 40 are used to position the rotary shaft 27 and the crankshaft 34 in an axially aligned manner. Closed-end positioning holes 41, 42 are respectively provided to the connecting protrusion 22e of the first bracket 22 and the side wall portion 23a of the second bracket 23. Opposite ends of each knock pin 40 are fitted in the corresponding pair of the positioning holes 41, 42.

Figure 8:
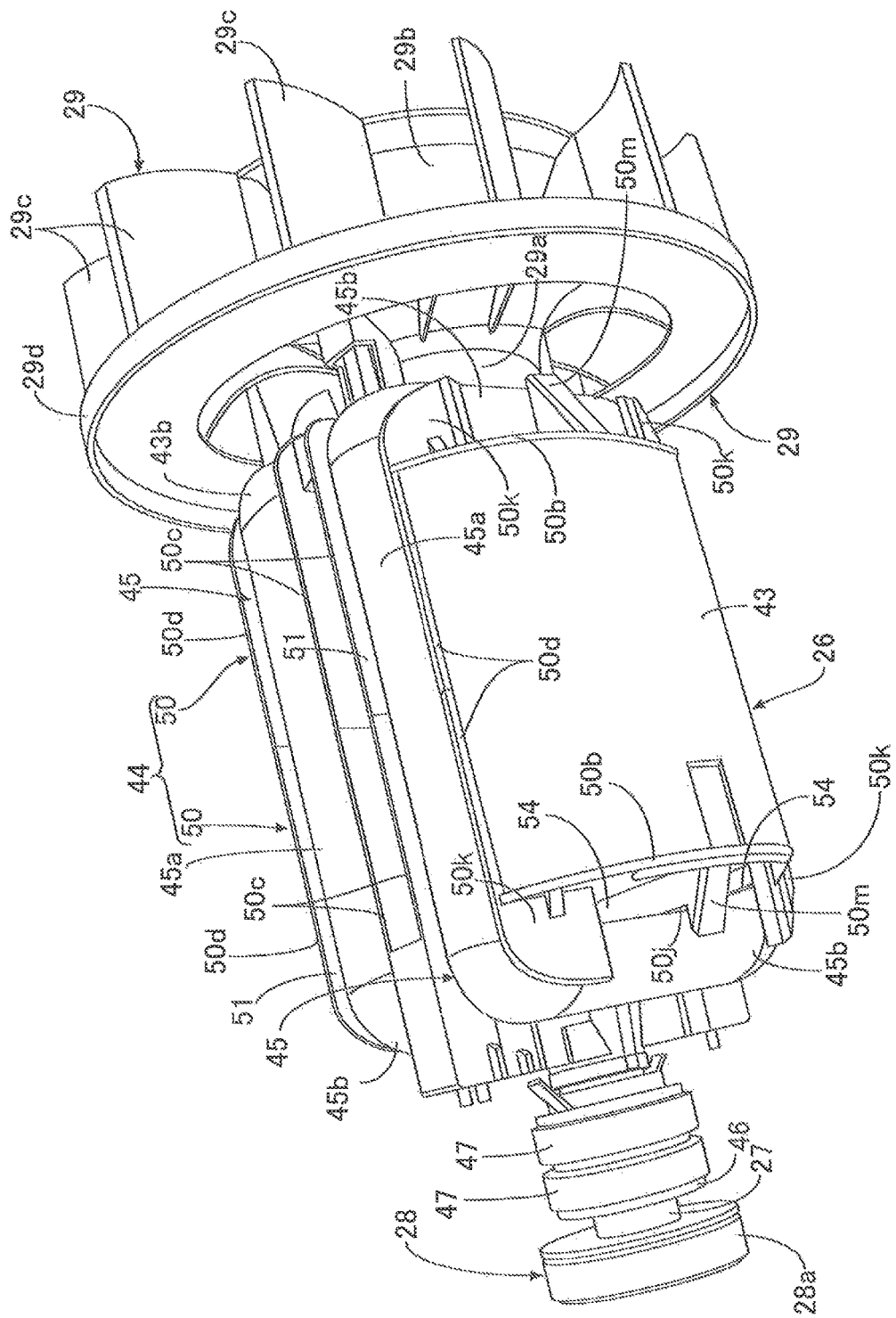
FIG. 8 is a perspective view of a rotor and a cooling fan (first embodiment).
Figure 9:
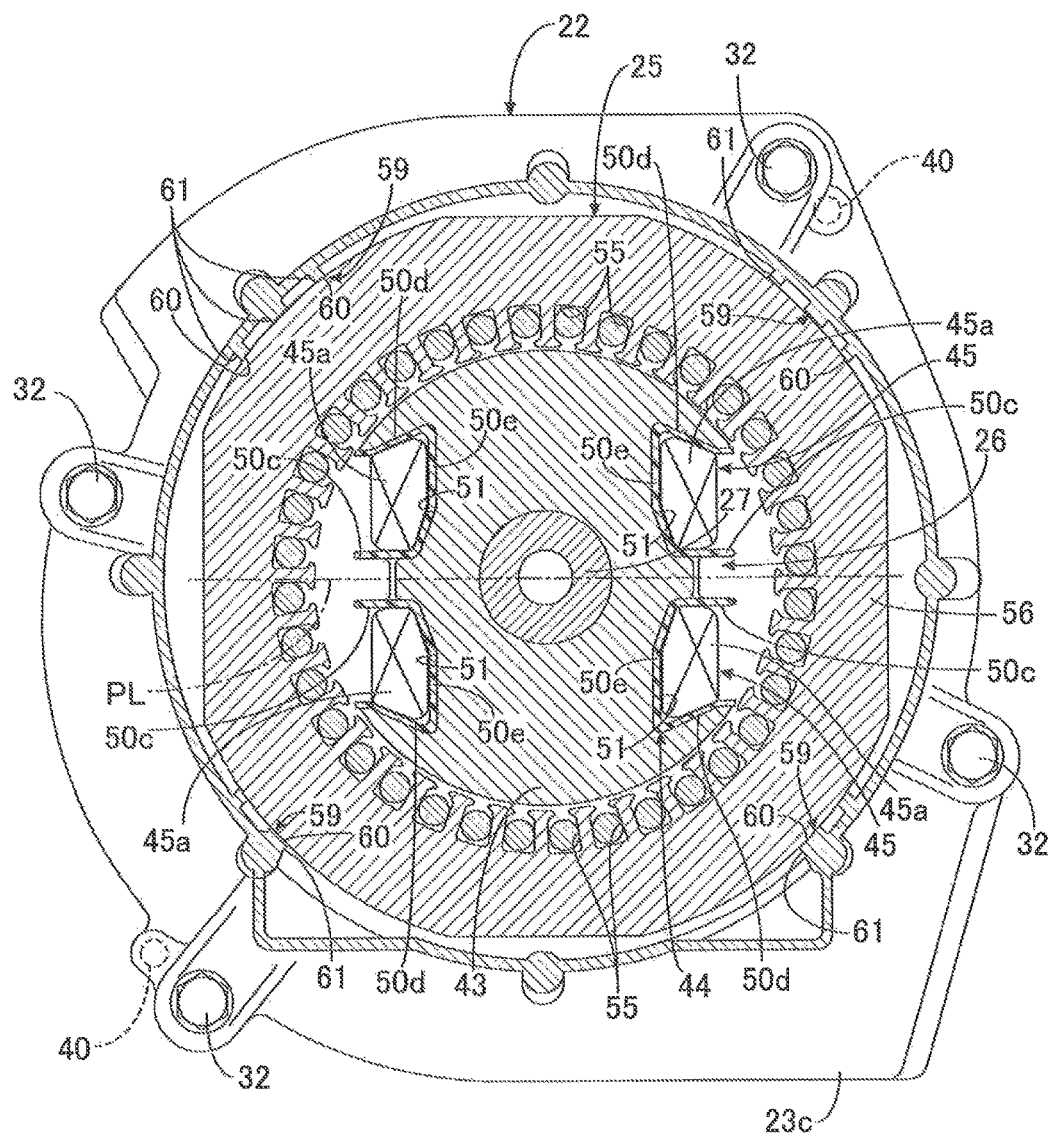
FIG. 9 is a sectional view taken along a 9-9 line in FIG. 4 (first embodiment).

Referring to FIGS. 8 and 9 together, the rotor 26 is formed by winding, via a bobbin 44, field coils 45, 45, which are disposed respectively on the opposite sides of one plane PL passing a center axis of the rotary shaft 27, in a rotor core 43 which is formed by stacking multiple electromagnetic steel sheets, and which is fixed to the rotary shaft 27.

Furthermore, the one end portion of the rotary shaft 27 is press-fitted in an inner race 28b of the ball bearing 28. A pair of slip rings 47, 47 electrically connected respectively to the pair of field coils 45, 45 are provided to an outer periphery of a slip ring supporting body 46 fixed to the rotary shaft 27 between the ball bearing 28 and the rotor 26, with a space in between in an axial direction of the rotary shaft 27. As shown in FIG. 4, a pair of brushes 49, 49 held by a brush holder 48 supported by the first bracket 22 are in slide contact with the slip rings 47, 47, respectively.

The bobbin 44 is formed by attaching a pair of synthetic resin-made bobbin half bodies 50, 50, which are formed in the same shape, to the rotor core 43 in a way that the rotor core 43 is interposed between the bobbin half bodies 50, 50 from opposite sides in a direction along the axis of the rotary shaft 27.

Figure 10:
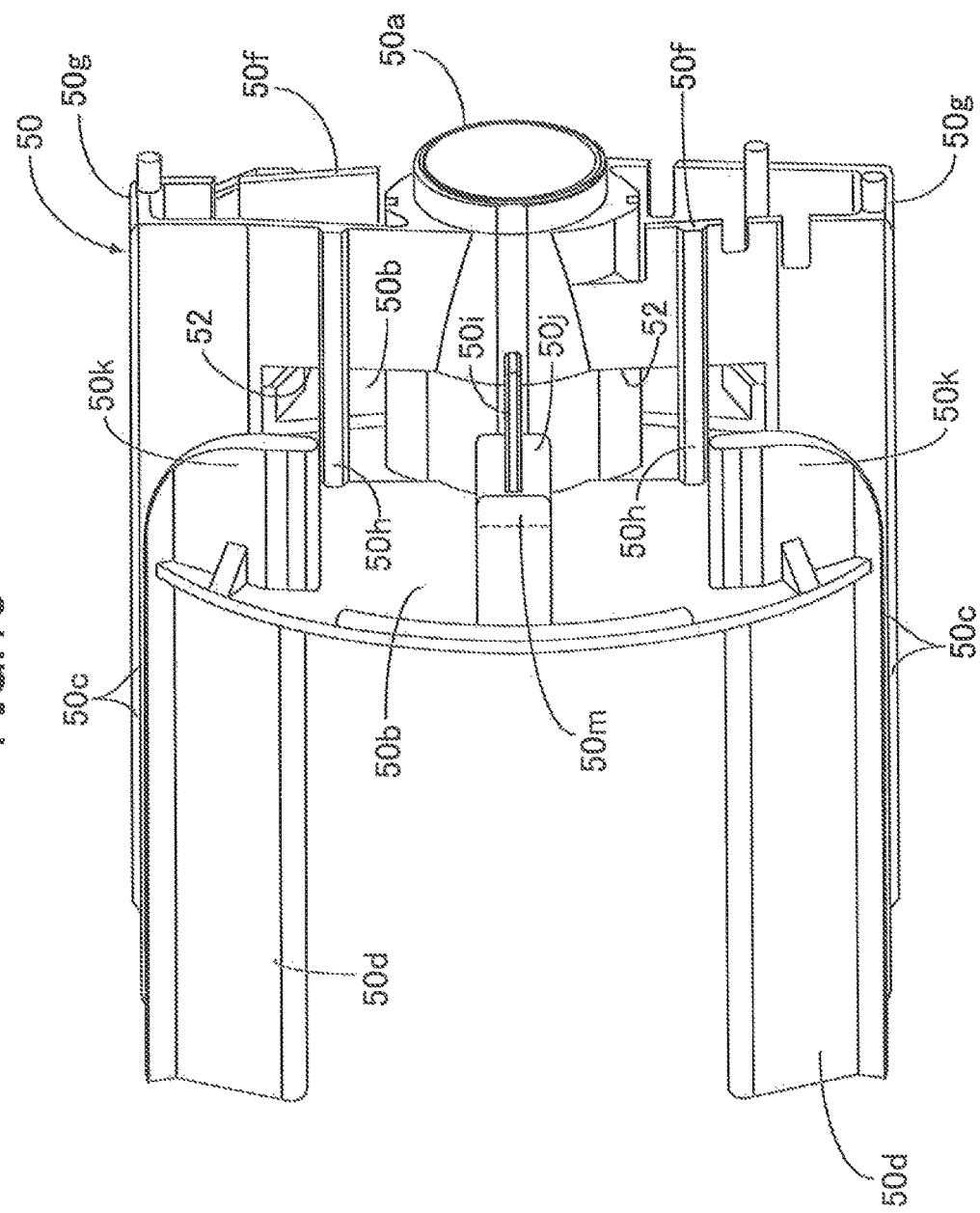
FIG. 10 is a perspective view of a bobbin half body (first embodiment).

Referring to FIG. 10 together, the bobbin half body 50 integrally includes: a cylindrical supporting portion 50a which allows insertion of the rotary shaft 27 outside the rotor core 43 along the axis of the rotary shaft 27; a pair of end plate portions 50b, 50b opposed to and in contact with the respective outer ends of the rotor core 43 which extends along the one plane PL passing the center axis of the rotary shaft 27 and continues to opposite sides of an inner end portion of the cylindrical supporting portion 50a, and which extends along the axis of the rotary shaft 27; two pairs of inner side plate portions 50c, 50c extending along the one plane PL in the axial direction of the rotary shaft 27, and each pair continuing to opposite longitudinal end portions of each of the end plate portions 50b on a side of the one plane PL; two pairs of outer side plate portions 50d, 50d extending in the axial direction of the rotary shaft 27 while opposed to the respective inner side plate portions 50c, 50c from a side far from the one plane PL, and each pair continuing to the opposite longitudinal end portions of each of the end plate portions 50b; bottom plate portions 50e, 50e respectively connecting the inner side plate portions 50c, 50c and the outer side plate portions 50d, 50d which are opposed to each other; a pair of inner restriction plate portions 50f, 50f uprightly provided to the end plate portions 50b, 50b so as to be flush with the inner side plate portions 50c, 50c, and continuing to the respective outer end portions of the cylindrical supporting portion 50a; and a pair of connecting plate portions 50g, 50g extending along the one plane PL, each of which connecting corresponding opposite end portions of the respective inner restriction plate portions 50f, 50f.

Grooves 51, 51 opened outward are respectively formed from: the inner side plate portions 50c, 50c; the outer side plate portions 50d, 50d opposed to the inner side plate portions 50c, 50c; and the bottom plate portions 50e, 50e connecting the inner side plate portions 50c, 50c and the outer side plate portions 50d, 50d. Two pairs of grooves 51, 51 extending in a direction along the one plane PL are formed in the bobbin half body 50, namely the bobbin 44. In addition, the inner restriction plate portions 50f, 50f is provided with circulation holes 52, 52 which are located in opposite sides of the cylindrical supporting portion 50a, respectively. Reinforcement frame portions 50h, 50h traversing the circulation holes 52, 52 in the direction along the axis of the rotary shaft 27 are integrally formed in the bobbin half body 50.

Figure 11:
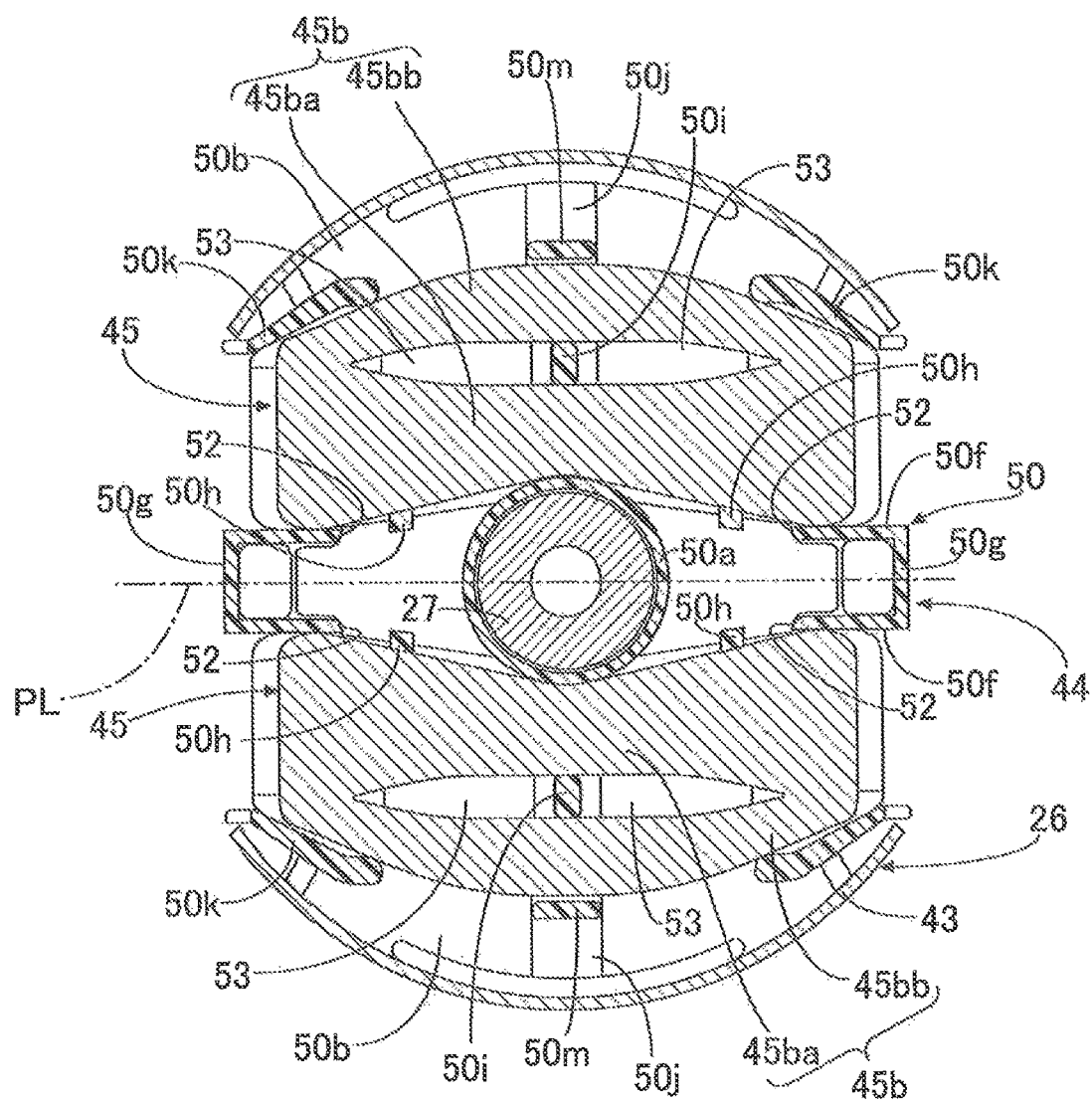
FIG. 11 is a sectional view of the rotor taken along an 11-11 line in FIG. 4 (first embodiment).

Referring to FIG. 11 together, each pair of grooves 51, 51 in the direction along the one plane PL passing the center axis of the rotary shaft 27 houses coil side portions 45a, 45a of the corresponding field coil 45, respectively. Coil end portions 45b, 45b of the field coil 45 at its opposite ends are connected to the pair of coil side portions 45a, 45a. Each coil end portions 45b is disposed covering the corresponding end plate portion 50b with movement of the coil end portions 45b toward the one plane PL restricted by the corresponding inner restriction plate portion 50f.

In addition, a part of the bobbin 44 corresponding to each outer end of the rotor core 43 is provided with separation protrusions 50i, 50i respectively for, as clearly shown in FIG. 11, dividing the coil end portions 45b, 45b of the field coils 45 into inner portions 45ba and outer portions 45bb in a radial direction of the rotary shaft 27. On opposite sides of each of the separation protrusion 50i, 50i in the peripheral direction of the rotary shaft 27, gaps 53, 53 are formed between a corresponding one of the inner portions 45ba and a corresponding one of the outer portions 45bb.

Meanwhile, the end plate portion 50b of the bobbin 44 is integrally provided with supports 50j, 50j which rise outward in the axial direction of the rotary shaft 27 from longitudinally central portions of the end plate portion 50b and support the coil end portions 45b, 45b in a way that, on opposite sides of each of the supports 50j, 50j in the peripheral direction of the rotary shaft 27, air passages 54, 54 are formed between a corresponding one of the coil end portions 45b and a corresponding one of the end plate portions 50b. In addition, the separation protrusions 50i are projectingly provided to the supports 50j, respectively.

Outer restriction protrusions 50K, 50K for restricting movement of the coil end portions 45b in directions away from the one plane PL are projectingly and integrally provided to outer peripheries of opposite longitudinally end portions of each end plate portion 50b. Restriction protrusions 50m for restricting outward movement of the coil end portions 45b placed on the supports 50j are projectingly and integrally provided to outer end portions of the supports 50j.

In addition, each of the air passages 54, 54, which is formed between the coil end portion 45b and the end plate portion 50b on the opposite sides of the corresponding support 50j, is opened to outside of the rotor 26 via interstices between the support 50j and the opposite outer restriction protrusions 50K, 50K in the corresponding outer end in the radial direction of the rotary shaft 27. Inner ends of the air passages 54, 54 in the radial direction of the rotary shaft 27 are opened to the outside of the rotor 26 in the outer end in the axial direction of the rotary shaft 27 via the circulation holes 52 provided to the inner restriction plate portions 50f.

Figure 12:
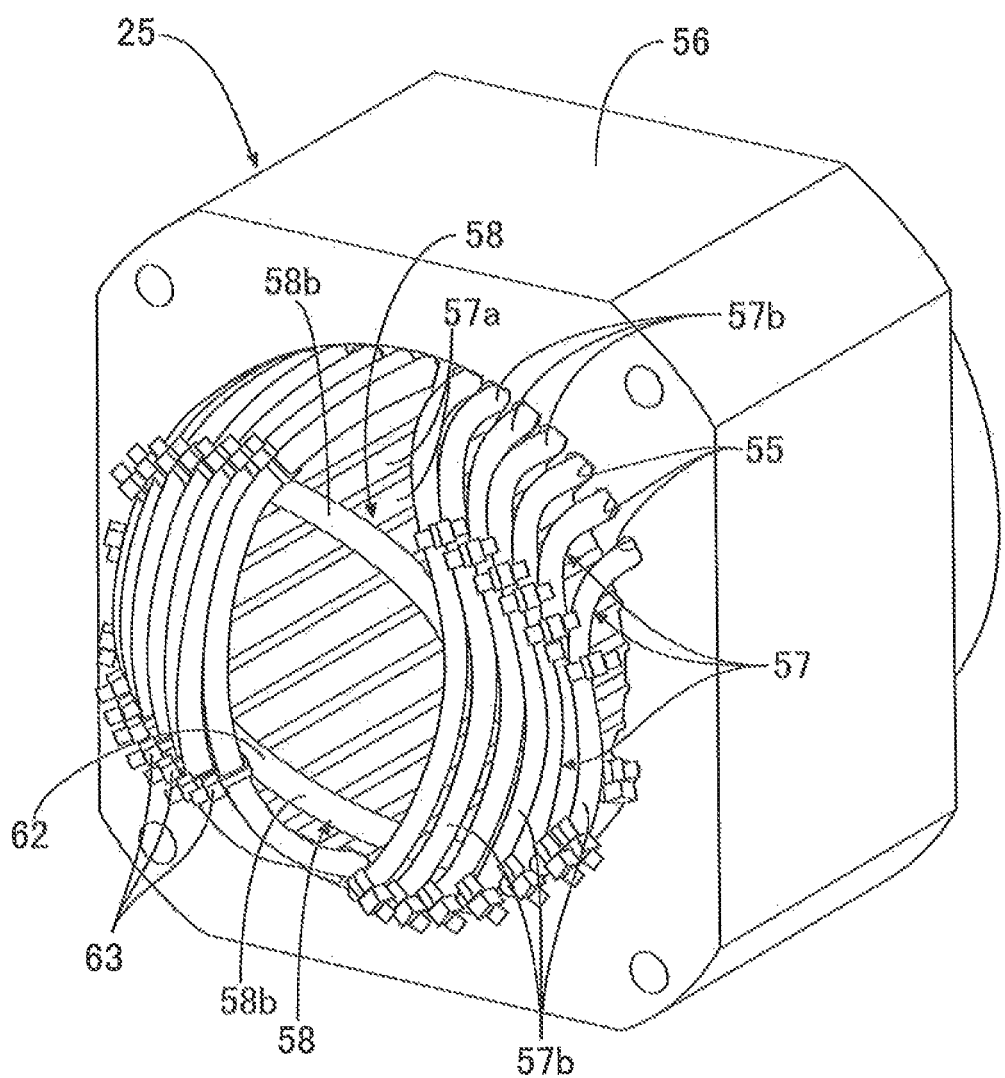
FIG. 12 is a perspective view of a stator (first embodiment).

Referring to FIG. 12 together, the stator 25 is formed by winding multiple output coils 57, 57 and a pair of exciting coils 58, 58 in a stator core 56 which is formed by stacking multiple electromagnetic steel sheets with multiple slots 55 provided in an inner periphery of the stator core 56.

Furthermore, the stator 25 is fixed to the first bracket 22 so as to be surrounded by the tubular portion 22b of the first bracket 22. Cooling air sucked in by the cooling fan 29 can flow between the rotor 26 and the stator 25, as well as between an outer periphery of the stator 25 and an inner periphery of the tubular portion 22b.

Multiple parts, for example, four parts, in a peripheral direction of an outer periphery of the stator core 56 of the stator 25 are press-fitted into the tubular portion 22b. Meanwhile, the inner periphery of the tubular portion 22b is tapered with a diameter of the inner periphery being the largest on a side of the second bracket 23 for the purpose of making the stator core 56 easy to insert into the tubular portion 22b from the side of the second bracket 23. Press-fitted portions 59 into which to press-fit the outer periphery of the stator core 56 are provided in four areas in an intermediate portion of the tubular portion 22b which are arranged at intervals in the peripheral direction of the tubular portion 22b.

The press-fitted portions 59 are each formed from two or three projecting threads 61, 61 which have, in their tip ends, press-fitted surfaces 60 extending along the axis of the rotary shaft 27 and which are integrally projectingly provided to an inner surface of the tubular portion 22b so as to extend in parallel to the direction along the axis of the rotary shaft 27. Through interstices between the projecting threads 61, 61, the cooling air can flow between the outer periphery of the stator 25 and the inner periphery of the tubular portion 22b.

Figure 13:
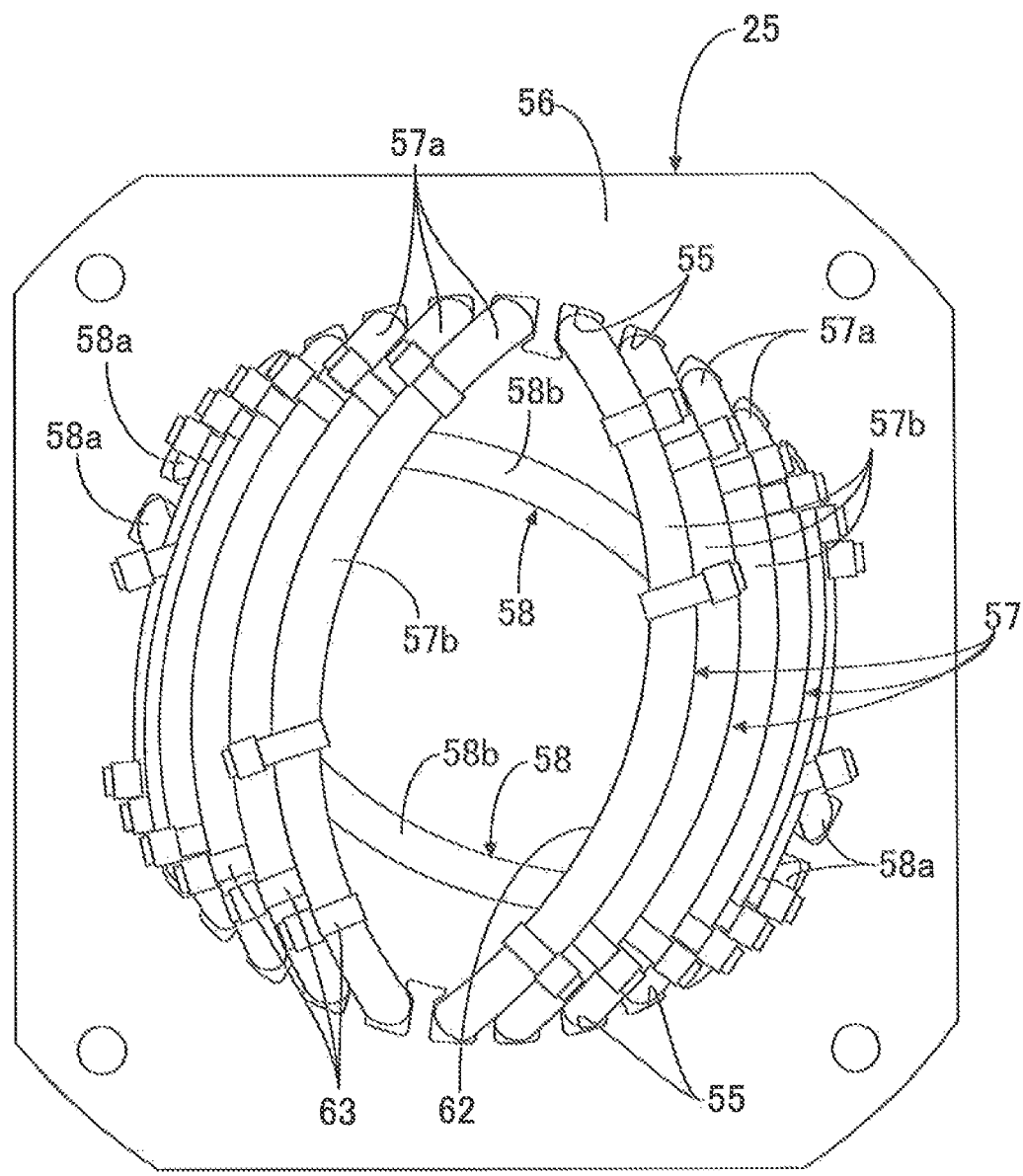
FIG. 13 is an elevation view showing an end of the stator in a direction along an axis of a rotary shaft (first embodiment).

Referring to FIG. 13 together, the multiple output coils 57, 57 and the pair of exciting coils 58, 58 are formed by connecting multiple coil side portions 57a, 57a; 58a, 58a and multiple coil end portions 57b, 57b; 58b, 58b. The coil side portions 57a, 57a; 58a, 58a are respectively housed in two slots 55, 55 and are isolated from each other in the peripheral direction of the stator core 56 with multiple slots 55, 55 interposed in between. The coil end portions 57b, 57b; 58b, 58b are respectively disposed outside opposite axial ends of the stator core 56.

Furthermore, at one end of the stator core 56 in the axial direction (one end of the stator core 56 opposite from the cooling fan 29 in the embodiment), in a view in the direction along the axis of the rotary shaft 27, the multiple coil end portions 57b, 57b; 58b, 58b, each of which connects the two corresponding slots 55, 55 by taking a short cut inside the inner periphery of the stator core 56, are disposed in a distributed manner with multiple wires forming the coil end portions 57b, 57b; 58b, 58b being fastened by fasteners 63, 63, and in a way that an opening 62 allowing the insertion of the rotary shaft 27 is formed in a central portion of the stator core 56. The coil end portions 57b, 57b; 58b, 58b disposed in the distributed manner are fixed to one another by varnish impregnation.

Focusing on FIGS. 4, 5 and 8 again, the cooling fan 29 integrally includes: a cylinder-shaped attachment tube portion 29a fitted onto and fixed to the rotary shaft 27 inside the second bracket 23; a taper tube portion 29b whose diameter becomes larger in a direction opposite from the rotor 26, and whose small-diameter end is continuously connected to the attachment tube portion 29a; multiple blades 29c, 29c whose base end portions are connectingly provided at positions arranged at intervals in a peripheral direction of an outer periphery of the taper tube portion 29b; and a ring plate-shaped partition plate 29d opposed to an end portion of the stator 25 on a side of the cooling fan 29, formed in a ring shape, and connectingly provided to outer peripheral portions of the multiple blades 29c, 29c in a common arrangement. Multiple reinforcement ribs 29e, 29e are integrally and projectingly provided to an inner periphery of the taper tube portion 29b.

A lower portion of the second bracket 23 is integrally provided with a discharge tube portion 23c for discharging cooling air flowing out through the cooling fan 29 toward a side of the second bracket 23. An outer end opening of the discharge tube portion 23c is provided with a louver 64 for partitioning the outer end opening into multiple parts.

Focusing on FIGS. 1 and 3 to 5, the cover 24 integrally includes a tubular side wall portion 24a and an end wall portion 24b which closes an outer end of the side wall portion 24a, and is formed from synthetic resin and in a bottomed tubular shape. The cover 24 is fixed to the first bracket 22 by being fastened to cylinder-shaped boss portions 22f, 22f, which are integrally provided to the opposite respective sides of the bearing portion 22a in the first bracket 22, with bolts 65, 65.

A lower portion of the side wall portion 24a of the cover 24 is provided with multiple first intake holes 66, 66 which are opened downward. In addition, opposite sides of the side wall portion 24a are provided with multiple second intake holes 67, 67 which extend long in the direction along the axis of the rotary shaft 27, and which are arranged at vertical intervals. The opposite sides of the side wall portion 24a are further provided with eaves portions 24c, 24c which project from upper edges of the second intake holes 67, 67 so as to hide the second intake holes 67, 67 in a side view. In addition, the end wall portion 24b of the cover 24 is provided with multiple third intake holes 68, 68. When the cooling fan 29 is in operation, the cooling air is sucked into the housing 21 from the first intake holes 66, 66, the second intake holes 67, 67, and the third intake holes 68, 68. Note that the third intake holes 68, 68 open downward so as to have a structure which prevents water such as rainwater or the like from easily entering from outside.

Meanwhile, a lower portion of one end portion of the first bracket 22, namely an end portion of the first bracket 22 on a side of the cover 24, is integrally provided with a pair of left and right attachment portions 22g, 22g which include flat attachment surfaces 70, 70 facing the cover 24 in a way that the attachment surfaces 70, 70 are disposed below the cover 24 in a view from the cover 24.

Figure 14:
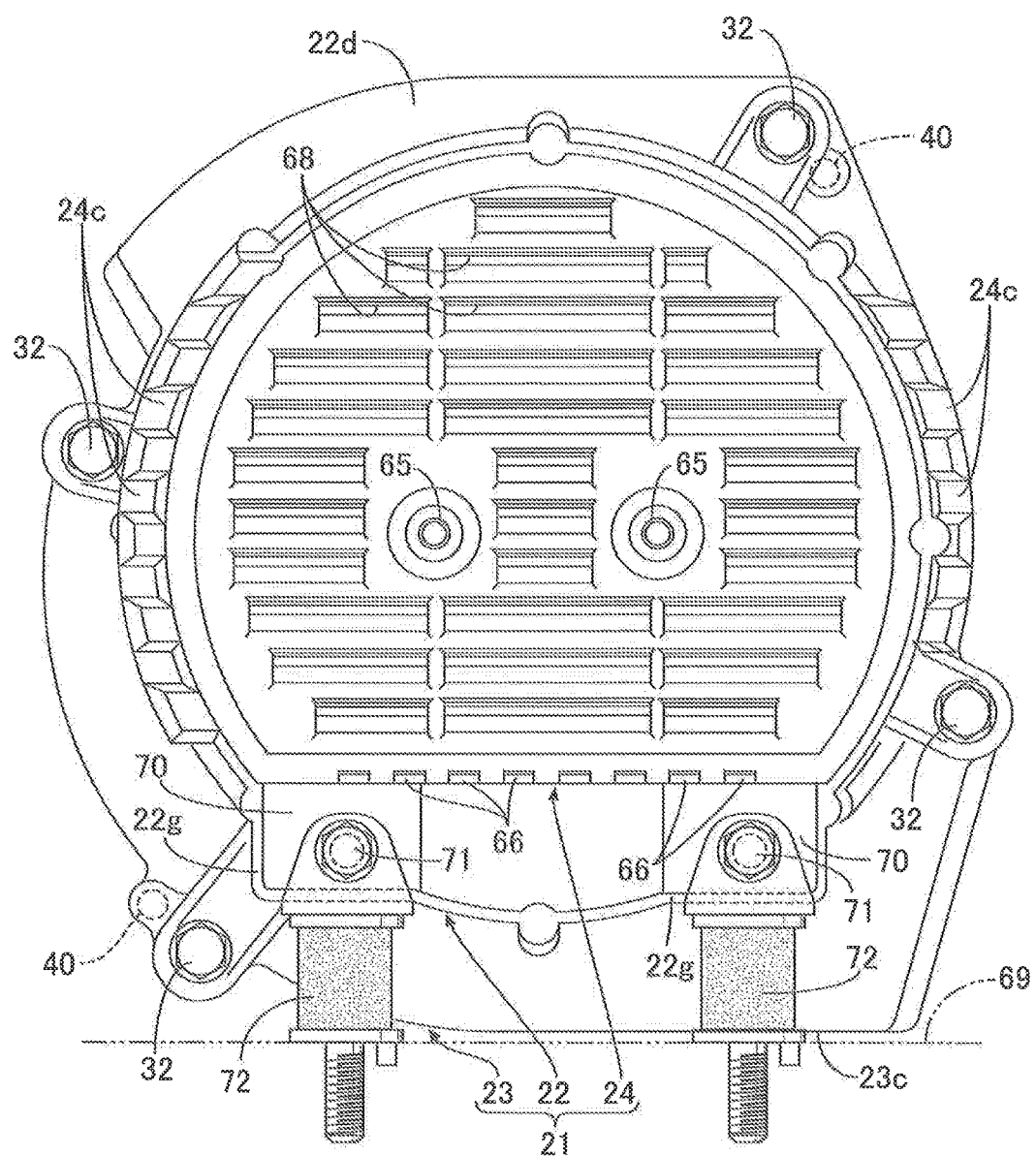
FIG. 14 is a view showing a state where rubber vibration insulators are attached to attachment portions, and corresponding to FIG. 3 (first embodiment).
Figure 15:
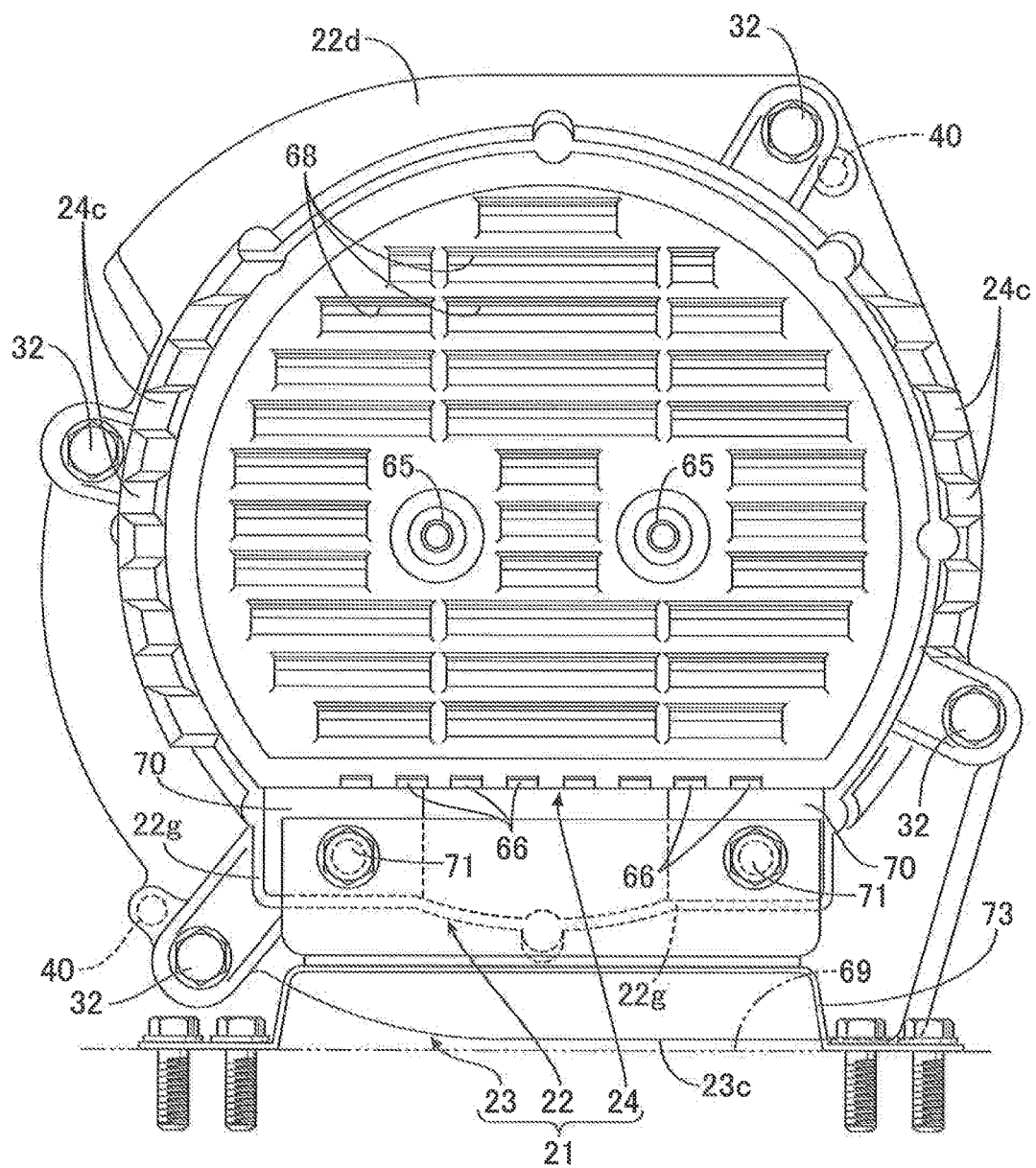
FIG. 15 is a view showing a state where an attachment leg is attached to the attachment portions, and corresponding to FIG. 3 (first embodiment).
Figure 16:
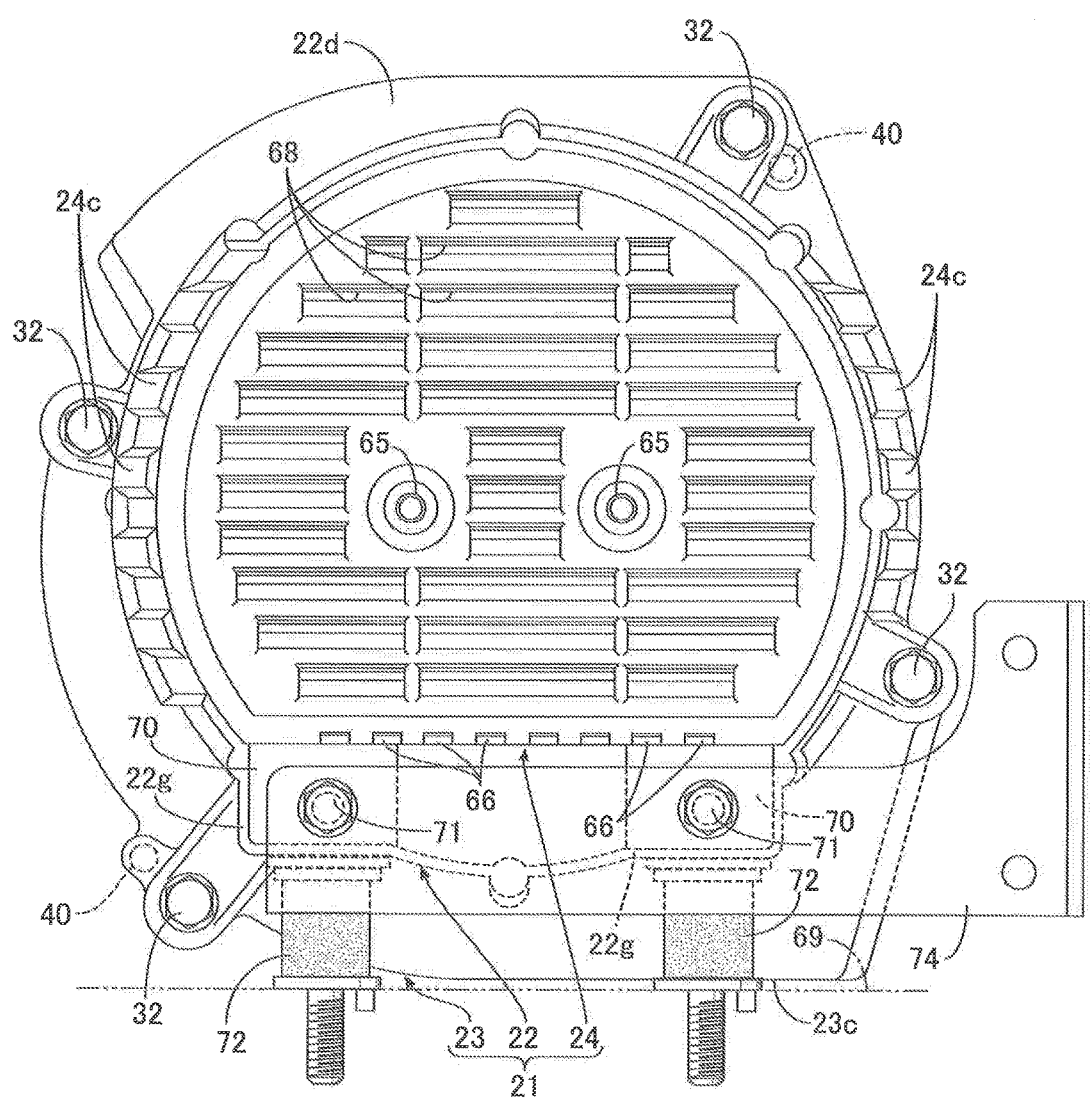
FIG. 16 is a view showing a state where a stay and the rubber vibration insulators are fastened together and attached to the attachment portions, and corresponding to FIG. 3 (first embodiment).

The attachment portions 22g, 22g are designed to be capable of switching to any one of: a condition where as shown in FIG. 14, a pair of rubber vibration insulators 72, 72 are attached to the attachment portions 22g, 22g with bolts 71, 71 in order for the generator to be supported on and by, for example, a stand 69 via the rubber vibration insulators 72, 72; a condition where as shown in FIG. 15, an attachment leg 73 is attached to the attachment portions 22g, 22g with the pair of bolts 71, 71 in order for the generator to be supported on and by, for example, the stand 69 via the attachment leg 73; and a condition where as shown in FIG. 16, a stay 74 for attaching an exhaust silencer and the rubber vibration insulators 72, 72 are fastened together and attached to the attachment portions 22g, 22g with the pair of bolts 71, 71. Thereby, a supporting leg portion of the generator can have versatility.

Next, descriptions will be provided for an operation of the first embodiment. The stator 25 is fixed to the housing 21 which includes: the first bracket 22 including the bearing portion 22a for pivotally supporting the one end portion of the rotary shaft 27; and the second bracket 23 for covering the cooling fan 29 which rotates with the rotary shaft 27. The rotor 26 surrounded by the stator 25 is fixed to the rotary shaft 27. The stator 25 is fixed to the first bracket 22. The first bracket 22 is integrally provided with the tubular portion 22b which surrounds the stator 25 in the way that the cooling air sucked in by the cooling fan 29 flows between the tubular portion 22b and the outer periphery of the stator 25. The second bracket 23 is connected to the tubular portion 22b. For these reason, it is possible to enhance efficiency of cooling the stator 25 by making the cooling air flow along the outer periphery of the stator 25, and to reduce cost by connecting the first and second brackets 22, 23 together without using long through-bolts.

In addition, the multiple areas of the outer periphery of the stator 25 in the peripheral direction are press-fitted into the tubular portion 22b. For this reason, it is possible to decrease the number of parts for fixing the stator 25 to the first bracket 22.

Furthermore, the ring plate-shaped partition plate 29d opposed to the end portion of the stator 25 on the side of the cooling fan 29 is fixedly provided to the cooling fan 29. For this reason, the end portion of the stator 25 on the side of the cooling fan 29 can be effectively cooled by the cooling air, by changing a flow direction of the cooling air having flowed along the outer periphery of the stator 25, toward the rotary shaft 27 at the end portion of the stator 25 on the side of the cooling fan 29.

Moreover, the first and second brackets 22, 23 are respectively provided with the positioning holes 41, 42 into which to fit the opposite end portions of the multiple knock pins 40 used to position the rotary shaft 27 and the crankshaft 34 in the axially aligned manner before the second bracket 23 fastened to the engine body 35 of the internal combustion engine E having the crankshaft 34 coaxially connected to the rotary shaft 27 is fastened to the first bracket 22 whose bearing portion 22a rotatably supports the one end portion of the rotary shaft 27. This design makes recessed and projecting fitting portions unnecessary unlike a design in which the first and second brackets 22, 23 are fittingly positioned to each other. For this reason, it is possible to enhance the cooling effect further by enlarging an outer diameter of the cooling fan 29 without enlarging a size of an outer shape of the second bracket 23.

Besides, the rotor 26 is formed by winding the field coils 45, 45 on the bobbin 44, which is installed in the rotor core 43 fixed to the rotary shaft 27, in a way that the field coils 45, 45 are disposed on the opposite respective sides of the one plane PL passing the center axis of the rotary shaft 27. The parts of the bobbin 44 corresponding to the axial outer ends of the rotor core 43 are provided with the separation protrusions 50i which divide the coil end portions 45b, 45b at the opposite ends of the field coils 45 in the axial direction of the rotary shaft 27, respectively, into the inner portions 45ba and the outer portions 45bb in the radial direction of the rotary shaft 27. On the opposite sides of each of the separation protrusions 50i in the peripheral direction of the rotary shaft 27, the gaps 53 are formed between the inner portion 45ba and the outer portion 45bb. For these reason, it is possible to increase the heat radiation area in each coil end portion 45b in each field coil 45, to thereby effectively cool the coil end portion 45b and in turn, the field coil 45, and to accordingly enhance the power generating efficiency.

Furthermore, each end plate portion 50b provided to the bobbin 44 so as to be opposed to and in contact with the corresponding axial outer end of the rotor core 43, is integrally provided with the support 50j, which rises outward in the axial direction of the rotary shaft 27 from the end plate portion 50b and supports the corresponding coil end portion 45b of the corresponding field coil 45, in the way that on the opposite sides of the support 50j in the peripheral direction of the rotary shaft 27, the air passages 54, 54 are formed between the coil end portion 45b and the end plate portion 50b. The support 50j is projectingly provided with one separation protrusion 50i. For these reasons, it is possible to further increase the heat radiation area in the coil end portion 45b, to thereby more effectively cool the coil end portion 45b and in turn, the field coil 45, and to accordingly enhance the power generating efficiency further.

In addition, the multiple slots 55, 55 are provided to the inner periphery of the stator core 56 which surrounds the rotor 26 fixed to the rotary shaft 27. The multiple output coils 57, 57 and the pair of exciting coils 58, 58 formed by connecting the multiple coil side portions 57a, 57a; 58a, 58a and the multiple coil end portions 57b, 57b; 58b, 58b are wound on the stator core 56. The coil side portions 57a, 57a; 58a, 58a are housed in the respective slots 55, 55 and are isolated from each other in the peripheral direction of the stator core 56 with the multiple slots 55, 55 interposed in between. The coil end portions 57b, 57b; 58b, 58b are respectively disposed outside the opposite axial ends of the stator core 56. At the one end of the stator core 56 in the axial direction, in the view in the direction along the axis of the rotary shaft 27, the multiple coil end portions 57b, 57b; 58b, 58b, each of which connects the two corresponding slots by taking a short cut inside the inner periphery of the stator core 56, are disposed in the distributed manner in the way that the opening 62 allowing the insertion of the rotary shaft 27 is formed in the central portion of the stator core 56. For these reasons, it is possible to reduce an amount of copper by shortening the lengths of the coil end portions 57b, 57b; 58b, 58b, and to enhance the cooling effect caused by the cooling air flowing inside the stator core 56. Furthermore, it is possible to increase the heat radiation areas of the coil end portions 57b, 57b; 58b, 58b, and to obtain a much better cooling effect.

Second Embodiment

Figure 17:
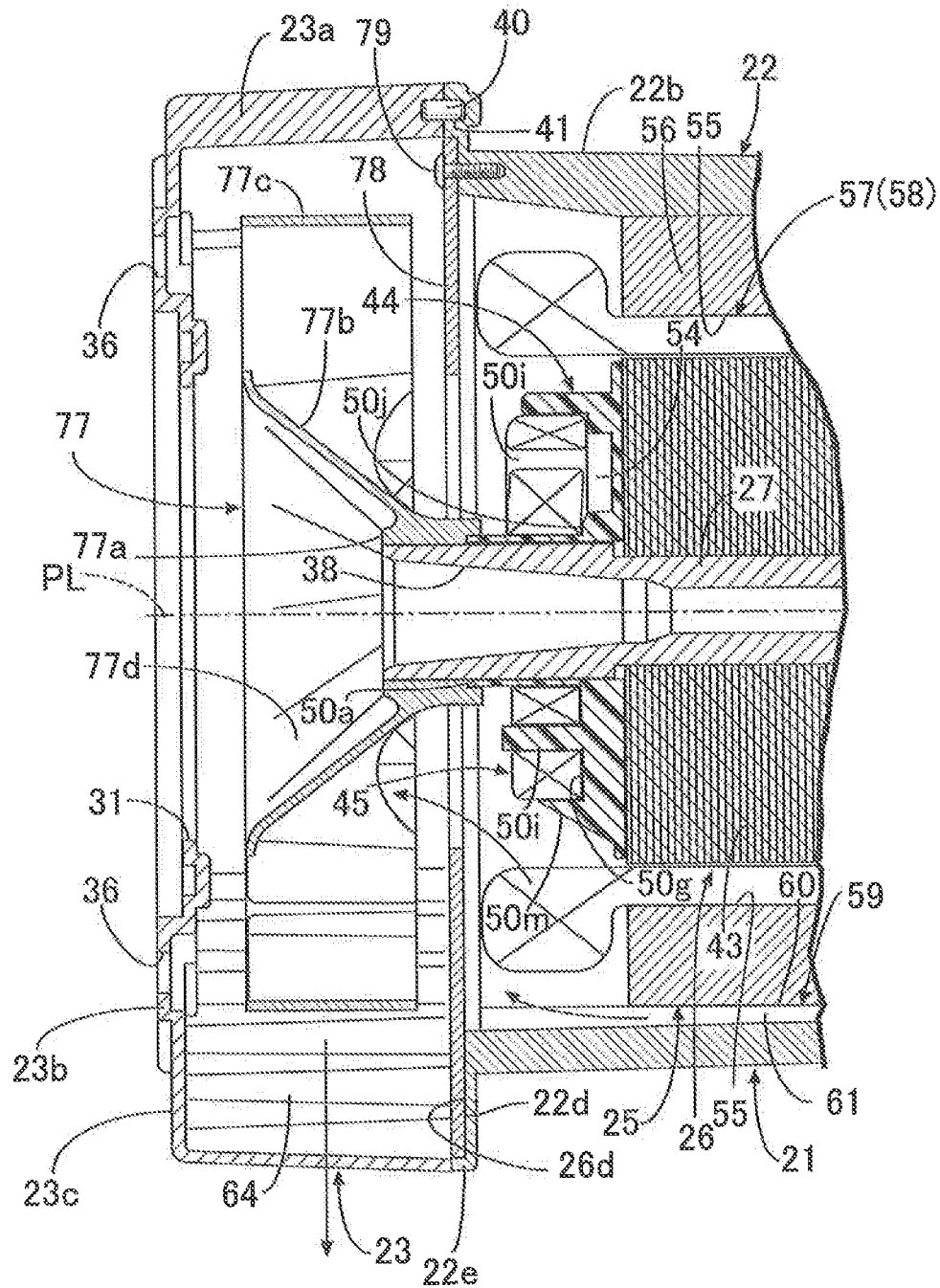
FIG. 17 shows a second embodiment of the present invention, and is a sectional view corresponding to part of FIG. 5 (second embodiment).

Referring to FIG. 17, descriptions will be provided for a second embodiment of the present invention. The second bracket 23 covers a cooling fan 77 which rotates with the rotary shaft 27. The cooling fan 77 integrally includes: a cylinder-shaped attachment tube portion 77a fitted onto and fixed to the rotary shaft 27 inside the second bracket 23; a taper tube portion 77b whose diameter becomes larger in a direction opposite from the rotor 26, and whose small-diameter end is connectingly provided to the attachment tube portion 77a; and multiple blades 77c, 77c whose base end portions are connectingly provided at positions arranged at intervals in a peripheral direction of an outer periphery of the taper tube portion 77b. Multiple reinforcement ribs 77d, 77d are integrally and projectingly provided to an inner periphery of the taper tube portion 77b.

Furthermore, a ring plate-shaped partition plate 78 opposed to an end portion of the stator 25 on a side of the cooling fan 77 is fixedly provided to an end portion of the tubular portion 22b of the first bracket 22 on the side of the cooling fan 77. In other words, an outer peripheral portion of the partition plate 78 is fastened to the outward-facing flange portion 22d, which is integrally provided to the end portion of the tubular portion 22b on the side of the second bracket 23, with multiple bolts 79.

The second embodiment also can effectively cool the end portion of the stator 25 on the side of the cooling fan 77 using the cooling air by changing the flow direction of the cooling air having flowed along the outer periphery of the stator 25, toward the rotary shaft 27 at the end portion of the stator 25 on the side of the cooling fan 77.

The foregoing descriptions have been provided for the embodiment of the present invention. Nevertheless, the present invention is not limited to the embodiment. Various design changes may be made to the present invention without departing from the gist of the present invention.

For example, fixing of the stator 25 to the first bracket 22 may be achieved by: inserting the stator 25 into the tubular portion 22b whose diameter is beforehand expanded by heating the first bracket 22 up to a temperature of several tens of degrees C.; and letting the tubular portion 22b contract as the temperature of the first bracket 22 returns to the original one.

The invention claimed is:

1. A generator in which
a stator is fixed to a housing which includes a first bracket having a bearing portion for pivotally supporting one end portion of a rotary shaft, and a second bracket covering a cooling fan that rotates with the rotary shaft, and
a rotor surrounded by the stator is fixed to the rotary shaft, wherein
the stator is fixed to the first bracket, and the first bracket is integrally provided with a tubular portion which surrounds the stator so as to permit cooling air sucked in by the cooling fan to flow between the tubular portion and an outer periphery of the stator,
the second bracket is connected to the tubular portion, and
the first and second brackets are respectively provided with positioning holes into which to fit opposite end portions of a plurality of knock pins used to position the rotary shaft and a driving shaft in an axially aligned manner before the second bracket fastened to a driving source having the driving shaft coaxially connected to the rotary shaft is fastened to the first bracket whose bearing portion rotatably supports one end portion of the rotary shaft.

2. The generator according to claim 1, wherein
a plurality of parts in a peripheral direction of the outer periphery of the stator are press-fitted into the tubular portion.

3. The generator according to claim 1, wherein
a ring plate-shaped partition plate opposed to an end portion of the stator on a side of the cooling fan is fixedly provided to the cooling fan or an end portion of the tubular portion on the side of the cooling fan.

4. The generator according to claim 2, wherein
a ring plate-shaped partition plate opposed to an end portion of the stator on a side of the cooling fan is fixedly provided to the cooling fan or an end portion of the tubular portion on the side of the cooling fan.

* * * * *